(12) United States Patent
Schoenberger et al.

(10) Patent No.: US 9,199,872 B2
(45) Date of Patent: Dec. 1, 2015

(54) METHOD OF ENVIRONMENTALLY FRIENDLY MELTING AND REFINING OF A GLASS MELT FOR A CRYSTALLIZABLE GLASS OF A LITHIUM ALUMINIUM SILICATE (LAS) GLASS CERAMIC

(75) Inventors: Klaus Schoenberger, Mainz (DE); Friedrich Siebers, Nierstein (DE); Ioannis Kosmas, Stadecken-Elsheim (DE); Matthias Stubenrauch, Woerrstadt (DE); Horst Blei, Mainz-Kostheim (DE); Reiner Best, Albig (DE); Eckhart Doering, Dolgesheim (DE); Udo Jakob, Albig (DE)

(73) Assignee: SCHOTT AG, Mainz (DE)

( * ) Notice: Subject to any disclaimer, the term of this patent is extended or adjusted under 35 U.S.C. 154(b) by 623 days.

(21) Appl. No.: 12/717,189

(22) Filed: Mar. 4, 2010

(65) Prior Publication Data
US 2010/0224619 A1   Sep. 9, 2010

(30) Foreign Application Priority Data

Mar. 5, 2009  (DE) .......................... 10 2009 011 850

(51) Int. Cl.
*C03B 5/225* (2006.01)
*C03C 6/00* (2006.01)
*C03C 6/04* (2006.01)
*C03C 1/00* (2006.01)
*C03C 10/00* (2006.01)

(52) U.S. Cl.
CPC ............. *C03C 1/004* (2013.01); *C03C 10/0045* (2013.01); *C03C 10/0054* (2013.01)

(58) Field of Classification Search
None
See application file for complete search history.

(56) References Cited

U.S. PATENT DOCUMENTS

| 2,998,675 | A | * | 9/1961 | Stookey et al. | ............... 428/410 |
| 3,157,522 | A | * | 11/1964 | Stookey | ............................. 501/7 |
| 3,253,975 | A | * | 5/1966 | Olcott et al. | .................. 428/410 |
| 3,380,818 | A | * | 4/1968 | Smith | ............................ 65/33.8 |
| 3,490,984 | A | * | 1/1970 | Petticrew et al. | ............. 428/410 |
| 3,524,738 | A | * | 8/1970 | Grubb et al. | .................. 65/30.1 |

(Continued)

FOREIGN PATENT DOCUMENTS

| DE | 199 39 771 | 2/2001 |
| DE | 199 39 787 | 2/2001 |

(Continued)

OTHER PUBLICATIONS

Notice of Opposition against European Patent No. EP 2226303 dated Oct. 9, 2013.*

(Continued)

*Primary Examiner* — Jason L Lazorcik
(74) *Attorney, Agent, or Firm* — Michael J. Striker

(57) ABSTRACT

The method of environmentally friendly melting and refining a glass melt of a crystallizable glass, which is used for making a lithium aluminum silicate (LAS) glass ceramic, includes the steps of providing a glass batch with a main batch composition within a lithium aluminum silicate (LAS) glass system, in which 0.1-<0.6% by weight of tin oxide has been added as main refining agent, but which does not contain arsenic oxide and/or antimony oxide as refining agent, formulating a raw material mixture for the glass batch, so that less than 40% by weight of the raw material mixture is quartz sand and then refining a glass melt formed from the glass batch at temperatures of at least 1600° C.

14 Claims, 2 Drawing Sheets

(56) References Cited

U.S. PATENT DOCUMENTS

| | | | |
|---|---|---|---|
| 3,532,524 A * | 10/1970 | Petticrew | 501/21 |
| 3,681,097 A * | 8/1972 | Beall et al. | 501/4 |
| 6,673,729 B2 | 1/2004 | Siebers et al. | |
| 6,698,244 B1 | 3/2004 | Roemer et al. | |
| 6,810,689 B2 * | 11/2004 | Romer et al. | 65/134.1 |
| 6,846,760 B2 | 1/2005 | Siebers et al. | |
| 6,933,255 B2 * | 8/2005 | Beall et al. | 501/128 |
| 7,465,686 B2 * | 12/2008 | Comte | 501/4 |
| 7,727,917 B2 * | 6/2010 | Shelestak et al. | 501/69 |
| 7,871,703 B2 * | 1/2011 | Shelestak et al. | 428/410 |
| 7,981,823 B2 * | 7/2011 | Siebers et al. | 501/7 |
| 8,053,381 B2 * | 11/2011 | Siebers et al. | 501/4 |
| 8,127,571 B2 * | 3/2012 | Martin et al. | 65/134.1 |
| 8,143,179 B2 * | 3/2012 | Aitken et al. | 501/4 |
| 2002/0092325 A1 * | 7/2002 | Muschik et al. | 65/134.3 |
| 2005/0143247 A1 | 6/2005 | Siebers et al. | |
| 2005/0250639 A1 | 11/2005 | Siebers et al. | |
| 2007/0004578 A1 * | 1/2007 | Monique Comte | 501/4 |
| 2007/0129231 A1 * | 6/2007 | Comte | 501/4 |
| 2007/0213192 A1 * | 9/2007 | Monique Comte et al. | 501/7 |
| 2007/0259767 A1 * | 11/2007 | Siebers et al. | 501/59 |
| 2008/0026927 A1 * | 1/2008 | Monique Comte | 501/7 |
| 2008/0206494 A1 * | 8/2008 | Kurachi et al. | 428/1.62 |
| 2010/0167903 A1 * | 7/2010 | Comte et al. | 501/27 |

FOREIGN PATENT DOCUMENTS

| | | | |
|---|---|---|---|
| DE | 19939771 A1 * | 2/2001 | |
| DE | 19939787 A1 * | 2/2001 | C03C 10/14 |
| DE | 10 2005 039 919 | 3/2007 | |
| DE | 102005039919 B4 * | 10/2009 | |
| EP | 0 908 417 | 4/1999 | |
| EP | 1593658 | 11/2005 | |
| EP | 1593658 A1 * | 11/2005 | |
| EP | 1 757 564 | 2/2007 | |
| FR | 2 902 420 | 12/2007 | |
| JP | 11100229 | 4/1999 | |
| JP | 11100229 A * | 4/1999 | C03C 4/10 |
| JP | 11100230 | 4/1999 | |
| JP | 11100230 A * | 4/1999 | C03C 4/10 |
| JP | 2001-354446 | 12/2001 | |
| JP | 2005-213132 | 8/2005 | |
| JP | 2005-267988 | 9/2005 | |
| JP | 2007-297239 | 11/2007 | |
| JP | 2009-40675 | 2/2009 | |
| WO | 02/16279 | 2/2002 | |
| WO | WO 0216279 A1 * | 2/2002 | |
| WO | WO 2007/003567 | 1/2007 | |

OTHER PUBLICATIONS

Haigh et al., "The Lithium Minerals in Industry", Glass, (1989), pp. 481-484.*

Prof. Dr. H.A. Schaeffer: "General Technology of Glass, Principles of Melting and Shaping", Erlange, Germany, Sep. 1985.

Guenther Noelle: "Glassmaking Technology", Deutscher Verlag Fuer Grundstoffindustrie, Stuttgart 1997, 3-rd Edition.

M. Haigh et al: "The Lithium Minerals Industry" Raw Materials, Glass, Dec. 1989, pp. 481-484.

Yuan Jian et al: "Prepatation of Spodumene-Derived Low Expansion Coefficient Glass Ceramic . . ." Journal of Wuhan University of Technology, vol. 12, No. 4, Dec. 1997, pp. 18-21.

"Luthium Minerals Review 2002" Raw Materials, 2002.

"Spodumene Typical Uses and Applications" Internet Sitation, 2007, http://www.spodumene.co.uk/uses.html.

* cited by examiner

METHOD OF ENVIRONMENTALLY FRIENDLY MELTING AND REFINING OF A GLASS MELT FOR A CRYSTALLIZABLE GLASS OF A LITHIUM ALUMINIUM SILICATE (LAS) GLASS CERAMIC

CROSS-REFERENCE

The invention described and claimed herein below is also described in German Patent Application 10 2009 011 850.0, filed Mar. 5, 2009 in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The invention relates to a method for the environmentally friendly melting and refining of a glass melt for a crystallizable glass that can be used to prepare a lithium aluminium silicate (LAS) glass ceramic.

2. Description of the Related Art

When glass is melted, considerable amounts of gases arise as a consequence of the chemical conversion of the starting raw materials, of the batch. In the case of conventional cost-effective batch mixes, approximately 1.3 kg of batch raw materials are required for producing approximately 1 kg of glass. This means that considerable amounts of gases such as $H_2O$, $O_2$, $CO_2$, $SO_2$, $NO_x$, $N_2$ and air included in the batch are liberated during the melting-down process. The method step for removing the gas bubbles from the glass melt is referred to as refining.

When the batch is introduced into the melting tank, a batch heap forms on the glass melt and spreads into the melting tank to different extents as a so-called batch carpet.

When the batch is heated, a wide variety of reactions proceed which lead to glass formation. A description of these reactions may be found in the book "Allgemeine Technologie des Glases, Grundlagen des Schmelzens und der Formgebung" ["General Technology of Glass, Principles of Melting and Shaping"], Prof. Dr. H. A. Schaeffer, Erlangen September 1985. These reactions are generally subdivided with increasing temperature into:
  dehydration
  solid-state reactions in the region of the grain contacts (e.g. silicate formation)
  formation of carbonate melts which envelop the quartz grains
  decomposition reactions which produce bubbles ($CO_2$, $NO_x$, $O_2$, $SO_3$)
  formation of silicate melts.

The remaining constituents of the batch subsequently dissolve in the silicate melt.

Under the temperature conditions of the melting-down of the batch, these reactions mentioned proceed more or less alongside one another. The principal amount of the gases escapes during the batch reactions and the formation of the unrefined melt through the covering layer of batch.

These reaction steps also proceed in the case of conventional raw material mixes for the batch of the crystallizable glasses of lithium aluminium silicate (LAS) glass ceramics. Main constituents here are generally quartz sand as source of the $SiO_2$ glass component, aluminium oxide or aluminium trihydroxide as source of the $Al_2O_3$ component and lithium carbonate as source of the $Li_2O$ component. Furthermore, the batch generally contains nitrates in order to set the oxidation state. When the temperature of the batch is increased, this gives rise firstly to release of water, then to nitrate decomposition and subsequently to liquid phase formation. What is crucial for the melting-down is the formation of a eutectic from the main constituents $Li_2O$ and $SiO_2$ at approximately 1030° C. In this first liquid lithium-rich silicate phase, the remaining crystalline raw materials such as aluminium oxide, quartz sand, zirconium, the refining agent, and also some of the remaining gases such as, for example, $O_2$, $CO_2$, $NO_x$, $N_2$ and $SO_2$ start to dissolve. As the remaining crystalline raw materials increasingly dissolve in the liquid phase, the gas solubility of the liquid phase decreases and buble formation occurs. In this case, the bubbles grow or shrink if the bubble internal pressure is lower or higher than the equilibrium pressure of the dissolved gases. Therefore, during refining, dissolved gases have to be extracted or reduced to a level that is no longer disturbing.

The dissolved gas residue in the end product is crucial for the reboil and should therefore be as small as possible.

Quartz sand and zirconium silicate and/or zirconium oxide are the last batch raw materials which are dissolved in the glass melt. They are those raw materials which determine the melting time and in the case of which, at excessively high tank throughputs, there is the risk of batch remnants. The dissolution rate is low in the case of LAS glasses and adhering bubbles bring the crystalline phases to the surface of the glass melt. The formation of surface layers composed of residual quartz and/or—formed from the latter at high temperatures—cristobalite ($SiO_2$) and baddeleyite ($ZrO_2$) is particularly pronounced in the case of aluminosilicate glasses.

The nature of the progression of the melting-down with targeted batch raw material selection, formation of the batch carpet and temperature of the glass in the melting-down region thus has crucial consequences for all subsequent sub-steps of glassmaking through to the product quality. If the melting rate during the melting-down process, as a result of excessively high tank throughput, is not coordinated with the removal at the processing end, quality problems (batch remnants, bubbles) occur in the glass. The sparingly soluble batch raw materials pass via the surface layer or via the depth flow into rear regions of the melting tank. As they dissolve, the gas solubility decreases in the chemically altered zone around the batch grains and the described effect of bubble formation occurs. The dissolving residual quartz grains are foreign seeds for continual new formation of bubbles (Nölle, Günther, Technik der Glasherstellung [Glassmaking Technology], Deutscher Verlag für Grundstoffundustrie Stuttgart 1997, 3rd edition, page 83). Micrographs showing such bubbles at the edge of dissolving residual quartz particles verify this mechanism. Such bubbles, which are produced in a late stage of the melting process, are virtually impossible to remove from the glass melt.

A targeted selection of the batch raw materials therefore has the potential to reduce the size of the batch carpet and the formation of the surface layers. By reducing the sparingly soluble batch raw materials, the risk of batch remnants and late bubbles is reduced. As is known, measures serving for homogenization always also make a contribution to refining, and vice versa. A batch raw material which comes close to the composition of the desired glass is therefore advantageous. Therefore, glass cullets which arise during production as well are added to the batch.

A reduction of the batch carpet and of the surface layer formation also promotes the heat input—required for increasing the temperature of the glass melt—by means of the infrared radiation from the gas burners and by means of reflection from the crown of the superstructure of the tank.

In a typical melting tank, the refining of the glass melt is carried out in a method step that temporally succeeds the melting-down and in a spatially separated region. The two regions are separated by the so-called hot spot of the melting tank. The hot spot is the point where the glass melt is at the highest temperature, that is to say that an upwardly directed flow of the glass melt takes place. As is known, various built-in structures are used in the design of typical melting tanks:

- overflow wall for avoiding short-circuit flows and for obtaining a temperature increase as a result of low glass level height
- bridge wall for avoiding short-circuit flows, primarily in the surface, and avoiding backflows
- gas burners, usually arranged in the transverse direction, which emit their heat by radiation from the flame or by reflection at the crown into the glass melt
- electrical additional heating for increasing the average glass temperature and flow stabilization
- bubblers arranged transversely and/or longitudinally with respect to the glass flow direction for avoiding short-circuit flows, for flow stabilization and for increasing the average glass temperature by transporting cold bottom glass to the hot surface.

In general, the hot spot in the tank is spatially fixed by the energy distribution (setting of the gas burners and of the electrical additional heating) or by additional structural measures such as an overflow wall, bubblers or electrical additional heating at the bottom of the tank.

The bridge wall is particularly suitable for counteracting the advance of the surface layers which are critical in the case of LAS glasses into the rear refining and standing region of the melting tank.

The glass level height should be adapted to the infrared transmission of the glass melt. Generally, an excessively large glass level height should be avoided in order to prevent cold zones in the bottom, which contributes to increasing the average glass temperature.

The effects of the built-in structures on the flow conditions in the melting tank are described and illustrated pictorially e.g. in the book by Nölle already cited (page 87 et seq.).

Refining involves assisting the gas bubbles in their endeavor, as a result of their static buoyancy owing to the difference in density between gas bubbles and glass melt, to ascend in the glass melt and then to escape into the open. Without supportive refining measures this process requires a considerable time, however, which would make the production process expensive owing to long stoppage times and low tank throughput resulting therefrom.

For LAS crystallizable glasses, various methods have developed as refining methods in a known manner.

In particular arsenic oxide and antimony oxide in contents of 0.3 to 1.5% by weight have proved worthwhile as chemical refining agents for LAS crystallizable glasses. These refining agents liberate $O_2$ gases even at conventional refining temperatures of around 1600° C. or less in the glass melt, which $O_2$ gases pass into the gas bubbles by diffusion. The gas quantities thus additionally passing into the gas bubbles lead to the desired bubble growth and thus to the desired increased rate of ascent of the gas bubbles. The ascending gas bubbles promote the homogeneity of the glass melt and counteract the surface layer. These refining agents are compatible with the required glass ceramic properties and lead to good bubble qualities of the melt.

Even if these substances are fixedly bound in the glass skeleton, they are still disadvantageous from safety and environmental protection standpoints. Special precautionary measures have to be taken during raw material procurement and preparation and owing to evaporation in the melt.

The search for alternative chemical refining agents which are less hazardous from environmental points of view has led to the use of tin oxide. The substitution of environmentally harmful arsenic oxide or antimony oxide by tin oxide alone is not readily possible owing to inadequate bubble qualities for economic tank throughputs. Owing to the low solubility of the tin oxide in the LAS crystallizable glasses, the maximum content is limited to values of less than 0.6% by weight or less. Devitrification otherwise occurs during shaping, owing to the low solubility. The Sn-containing crystals formed during devitrification adversely affect the strength of the glass and of the glass ceramic produced therefrom. Higher refining agent concentrations, as during chemical refining using arsenic oxide or antimony oxide, are therefore not possible. Furthermore, tin oxide liberates the oxygen required for refining in sufficient amounts only at relatively high temperatures. This reduces the efficiency of the use of tin oxide as a refining agent at customary conventional melting temperatures of up to 1700° C. The favorable effect of homogenization of the glass melt, which counteracts the formation of surface layers, is also less pronounced owing to the small amounts of the liberated $O_2$ refining gas.

Therefore, ways have been sought for intensifying the refining effect of tin oxide by means of additional measures.

In order to achieve good bubble qualities, further refining agents are used alongside tin oxide, for example at conventional melting and refining temperatures (max. 1700° C.). A number of documents describe the use of halide compounds as additional refining agents.

Thus, the Japanese applications JP 11 100 229 A and JP 11 100 230 A describe the use of 0.1-2% by weight of $SnO_2$ and 0-1% by weight of Cl. According to these documents, coloration is performed by adding $V_2O_5$ as sole colorant.

The addition of 0.05-1% by weight of fluorine (US 2007 0004578 A1) and 0.01-1% by weight of bromine (US 2008 0026927 A1) for supporting the refining using $SnO_2$ is likewise disclosed. The main colorant is $V_2O_5$.

The addition of the halide compounds is disadvantageous since they evaporate to a large extent at the melting temperature and in the process form toxic compounds, such as e.g. HF or HCl. Furthermore, these compounds chemically attack the refractory bricks in the crown of the melting tank and corrosion occurs.

The document US 2007 0129231 A1 describes the combined use of 0.15 to 0.3% by weight of $SnO_2$ in combination with 0.7 to 1.5% by weight of $CeO_2$ and/or $MnO_2$ as refining agents. Compared with refining by means of $As_2O_3$, these refining agent combinations yield distinctly poorer bubble qualities despite the comparatively high contents of $CeO_2$ and/or $MnO_2$. This is due to the fact that $CeO_2$ and $MnO_2$ cleave the oxygen required for refining at comparatively low temperatures and are less effective for the refining of the high-melting LAS crystallizable glasses.

Since the refining agent tin oxide releases the oxygen required for refining in relatively large amounts only at relatively high temperatures starting from approximately 1630° C., high-temperature refining above 1700° C. is appropriate for achieving good bubble qualities.

Thus, DE 199 39 771 B4, for example, discloses producing relatively high temperatures of between 1700° C. and 2800° C. by means of separate high-temperature refining units disposed downstream of the melting tank using radio-frequency and skull technology, in order thus to reduce the viscosity of the melt and hence to increase the rate of ascent of the gas bubbles.

In this case, two independent refining units connected to one another are typically provided.

WO 02/16279 A1 (=DE 199 39 787 C2), too, describes, inter alia, the production of a lithium aluminium silicate (LAS) glass ceramic colored with $V_2O_5$ in conjunction with reducing agents by means of high-temperature refining at 1975° C. for 1 h without the standard refining agents arsenic oxide or antimony oxide, but rather with alternative refining agents such as $SnO_2$, $CeO_2$, sulphate or chloride compounds. This glass ceramic, which appears black in plan view is typically used for the production of cook tops and is commercially available under the brand designation CERAN SUPREMA®.

These additional high-temperature refining units require capital expenditure on specific units and a different distribution of the energy input.

A further physical refining method is so-called vacuum refining. By way of example, reference should be made in this respect to EP 0 908 417 A2. The bubbles present in the melt likewise grow in the case of vacuum refining. The bubbles become larger as a result of these effects, ascend to the surface of the melt more rapidly and can leave the latter into the overlying furnace space.

Complex constructions are required for this method.

DE 10 2005 039919 A1 describes a method for refining a glass melt for a glass ceramic green glass, and a melting tank embodied accordingly. Provision is made of a glass batch on the basis of a lithium aluminium silicate (LAS) glass system with a sole addition of tin oxide as refining agent having a content of <0.4% by weight, while dispensing with arsenic oxide and/or antimony oxide as refining agent. The melting-down of the batch and refining of the melt are carried out at temperatures of <1700° C. while dispensing with additional specific high-temperature refining units. Depending on the tank construction, the refining agent content and the average glass temperature, a minimum residence time of the glass to be refined in the tank arises for the required bubble quality. In this method, too, the disadvantages of pure $SnO_2$ refining at conventional refining temperatures are manifested in the limited tank throughputs. The document describes various melting tank designs which are also taken into account in the present invention.

SUMMARY OF THE INVENTION

It is an object of the invention to provide a method for the environmentally friendly melting and refining of a glass melt for a crystallizable glass of a lithium aluminium silicate (LAS) glass ceramic which ensures economic production for moderate refining agent contents with sufficiently low bubble counts in the glass and thus also in the ceramized product.

This object is achieved by means of a method claimed in the appended claims.

This object is achieved according to the invention by means of a method for the environmentally friendly melting and refining of a glass melt for a crystallizable glass of a lithium aluminium silicate (LAS) glass ceramic, comprising the following steps:

providing a glass batch on the basis of a lithium aluminium silicate (LAS) glass system with addition of 0.1-<0.6% by weight of tin oxide as main refining agent while dispensing with arsenic oxide and/or antimony oxide as refining agent, designing the raw material mix for the glass batch to the effect that the proportion of the quartz sand raw material that is usually used for introducing the glass component $SiO_2$ is less than 40% by weight, preferably less than 15% by weight, and particularly preferably less than 5% by weight, and refining the glass melt at temperatures of at least 1600° C. and preferably at least 1650° C.

The method according to the invention for the environmentally friendly melting and refining of a glass melt for a crystallizable glass of an LAS glass ceramic is distinguished by the fact that, apart from unavoidable traces, the chemical refining agents arsenic oxide and/or antimony oxide are dispensed with and the desired low bubble counts are achieved by combination of a plurality of measures.

Tin oxide is used as the main refining agent in contents of 0.1 to <0.6% by weight. Owing to the described release of the oxygen required for refining at relatively high temperatures, it is necessary, furthermore, for the glass melt to be heated to temperatures of at least 1600° C. and preferably at least 1650° C. for the refining.

It has been found, however, that these measures alone are insufficient. For the increase in the tank throughput that is desired for economic reasons, it is likewise necessary for the raw material mix for the glass batch already to be designed such that the proportion of the raw material quartz sand that is usually used for introducing the glass component $SiO_2$ is minimized. With higher contents, a layer forms at the glass surface when the batch is melted, said layer extending relatively far into the melting tank. This surface layer is enriched by the batch remnants of $SiO_2$ (residual quartz) and the Zr raw material. The batch particles are held at the glass surface by adhering bubbles. As a result of the slow dissolution, bubbles are produced in late stages of the melting process and impair the bubble quality. In order to minimize the quartz sand as a source for the formation of bubbles in the late stage of the process, the proportion of the quartz sand in the raw material mix for the glass batch is intended to be less than 40% by weight, preferably less than 15% by weight. Possibly added cullets are not taken into account in the calculation since what is primarily of importance is melting down and homogenizing the batch raw materials that do not correspond to the LAS glass in terms of their composition. A proportion of the quartz sand in the raw material mix for the glass batch of less than 5% by weight is particularly preferred. With these low values, particularly good glass qualities are achieved with regard to bubble quality, homogeneity and favorable melting-down behavior with few batch remnants in the surface.

The stated measures are necessary in combination in order to achieve the desired bubble counts. The latter are less than 3 bubbles/kg of glass, preferably less than 1 bubble/kg of glass. These values are relative to bubble sizes of at least 100 µm.

Dispensing with arsenic oxide and antimony oxide as refining agents means that the glasses obtained are substantially technically free of these components. The components As or Sb are present as contaminants usually in contents of less than 0.04% by weight.

According to one preferred method, a combination of the refining agents tin oxide and iron oxide is used in order to achieve improved results with regard to bubble quality and economic viability. While the use of tin oxide as a refining agent is known, to date the use of iron oxide as a refining agent has not received particular attention industrially. This is due to the fact, firstly that the release of oxygen associated with the transition from $Fe^{3+}$ to $Fe^{2+}$ in relatively large amounts commences only at high temperatures of above approximately 1600° C., in a manner similar to that in the case of tin oxide. Furthermore, iron oxide is a colorant and undesirable in the production of transparent glasses.

As has been found, with the combination of the two refining agents, the efficiency of both refining agents is significantly increased. This is explained by redox interactions between the two refining agents. When tin oxide is present in the glass melt, the proportion of $Fe^{2+}$ that is found is higher than in the case of a melt having an otherwise identical composition which contains no tin oxide. This observation supports this explanation. The glass batch on the basis of a lithium aluminium silicate (LAS) glass system is intended to contain a combination of 0.1-<0.6% by weight of tin oxide and 0.05-0.3% by weight of iron oxide as refining agent.

Since the refining process is closely linked with homogenization, it is advantageous if a batch raw material is used which already contains the main components of the LAS glass $SiO_2$, $Al_2O_3$ and $Li_2O$ and which comes close to the final glass composition. This is achieved by using an $Li_2O$—$Al_2O_3$—$SiO_2$ compound as dominant batch raw material, which makes up at least 45% by weight of the raw material mix. Preferably the proportion of the $Li_2O$—$Al_2O_3$—$SiO_2$ compound is intended to be more than 70% by weight. Possibly added cullets are not taken into account in the calculation.

Preferably, petalite and/or spodumene are/is used as main batch raw material. The use thereof permits the three main components to be introduced homogeneously in a ratio which comes close to the composition of the LAS glass. The proportion of the quartz sand in the batch is minimal for this raw material.

The batch carpet that arises when the batch is melted down is also minimized by this measure. The minimization of the floating batch carpet supports the heat input by means of the gas burners from the flame and by means of reflection from the tank crown into the glass melt. This is advantageous because this promotes the high glass temperatures which are positive for refining using tin oxide and also iron oxide. Moreover, this is advantageous for economic reasons because higher tank throughputs are possible and fewer energy losses arise.

According to one preferred method, provision is made of the glass batch for the LAS glass system such that the ratio of the maximum amount of $O_2$ refining gas (in mol) liberated during refining is in a specific relationship to the amount of insoluble foreign gases released during batch decomposition. The expression insoluble foreign gases denotes the gases released during decomposition, such as $CO_2$, $SO_2$, $NO_x$, $N_2$, which have only very low solubility in LAS glasses. By contrast, $H_2O$, which, as is known, has good solubility, is not counted among said insoluble foreign gases. The relationship on the basis of the gas amounts in mol which lead to particularly good results during refining reads:

$O_2$ [mol]/foreign gases [mol]>0.02

The amount of released $O_2$ refining gas is intended to be at least 2% of the amount of released insoluble foreign gases. What is thereby achieved is that a sufficient amount of $O_2$ refining gas is available for the refining, which gas can diffuse into the bubbles of the insoluble foreign gases. As a result of the growth in size and accelerated ascent of the bubbles, the latter are removed from the glass melt during refining.

For the homogenization of the glass melt and for an improved melting-down method, the addition of 20 to 60% by weight of cullets to the glass batch is advantageous. The formation of the batch carpet and of the surface layer is reduced further during melting-down. The cullets involved are essentially those that correspond to the composition of the LAS glass and which arise in production e.g. from bottom outlets of the melting tank or as cutting waste residues when cutting the pane formats from the glass ribbon produced, or generally from production rejects. In order to bring about this favorable homogenization effect, the minimum amount of cullets added is 20% by weight. The amount is intended not to exceed 60% by weight, for economic reasons, since said cullets were melted using energy, and endeavors are made to keep the rejects low.

As has already been explained, it is advantageous for increasing the temperature of the glass melt to reduce the batch carpet and the surface layer formation. The thermal irradiation originating from the flames of the gas burners themselves and as a result of reflection from the tank crown enters into the glass melt without being impeded and is absorbed.

The bottom of the melting tank is also heated to a greater or lesser extent depending on the glass level height. An excessively cold tank bottom should be avoided because the temperature of the glass melt is lowered thereby. For technical reasons, limits are imposed on the variation of the glass level in the melting tank for optimizing the bottom temperature. If the glass level has to be chosen to be very low, this means an uneconomic large base area of the tank in the case of a predetermined tank size for the melting volume. An excessively high glass level entails the risk that deep bubbles cannot be removed from the melt on account of the large ascent height. It is therefore advantageous if the infrared absorption of the glass melt is set such that good absorption conditions for the thermal radiation from the superstructure of the tank are achieved for an average glass level height of approximately 50 to 100 cm. This brings about a good heat input for increasing the temperature of the glass melt. The infrared absorption of the glass melt must not be too high, in order that the bottom of the tank does not become too cold and the glass melt is soaked sufficiently homogeneously in the depth. On the other hand, the bottom of the tank with the refractory bricks must be prevented from becoming too hot. If the refractory bricks are heated too much, they can become the source of secondary bubbles as a result of reaction with the glass melt. The two requirements are reconciled with one another well if the infrared absorption of the glass corresponds to a value of 40 to 80% when measured at 1600 nm, at room temperature and given a thickness of 4 mm. Since the glass components and also the $V_2O_5$ optionally used for coloration exhibit little absorption in the infrared, a crucial role for setting the infrared absorption of the glass melt is accorded to the refining agent iron oxide, and here in particular the $Fe^{2+}$ proportion. This is accomplished with the contents according to the invention of 0.05 to 0.3% by weight.

The combination according to the invention of the described measures for refining makes it possible, in an economic manner, to carry out the refining at temperatures of the glass melt of less than 1700° C. with moderate refining agent contents. At these refining temperatures, the refining can still be carried out in conventional melting tanks without additional units such as e.g. specific high-temperature or vacuum refining units, with the required bubble qualities. The economic advantage is that the capital expenditure for the additional units is saved.

During refining in a conventionally constructed melting tank, this temperature is reached at the hot spot. As a result of the upwardly directed flow at the hot spot, the bubbles reach the vicinity of the surface. This means that the distance that has to be covered by bubbles until they are removed from the glass melt is minimal as well. If the glass temperature here is high, this means a low viscosity of the glass and thus high rates of ascent of bubbles, which are additionally expanded by the high temperatures. In order to achieve this local temperature setting in the melting tank, a tank design is preferably chosen in which heating is effected both electrically by means of electrodes and by means of gas burners.

In an alternative method, it may be advantageous to carry out the refining of the glass melt at temperatures of greater than 1700° C., preferably greater than 1750° C. This is the case particularly when high requirements are made of the bubble quality and/or when higher tank throughputs are desired for a predetermined size of the melting tank. A melting tank with a high-temperature refining unit is also more flexible with respect to the glass composition to be melted. If, for technical reasons, e.g. owing to specific requirements made of the glass ceramic product, glass compositions having higher melting viscosities are required, then the latter can likewise be refined without technical problems, with satisfactory bubble quality, through the use of the high-temperature refining.

Preferably, in the method according to the invention, provision is made of a glass batch for an LAS glass system which leads to a colored glass ceramic with beta-quartz solid solutions as predominant crystal phase, having a composition in % by weight on the basis of oxide which substantially consists of:

| | |
|---|---|
| $Li_2O$ | 3.0-4.2 |
| $\Sigma Na_2O + K_2O$ | 0.2-1.5 |
| MgO | 0-1.5 |
| $\Sigma CaO + SrO + BaO$ | 0-4 |
| ZnO | 0-2 |
| $B_2O_3$ | 0-2 |
| $Al_2O_3$ | 19-23 |
| $SiO_2$ | 60-69 |
| $TiO_2$ | 2.5-4 |
| $ZrO_2$ | 0.5-2 |
| $P_2O_5$ | 0-3 |
| $SnO_2$ | 0.1-<0.6 |
| $\Sigma TiO_2 + ZrO_2 + SnO_2$ | 3.8-6 |
| $V_2O_5$ | 0.01-0.06 |
| $Fe_2O_3$ | 0.05-0.3. |

The expression "substantially consists of" means that the components presented are intended to amount to at least 96%, generally 98%, by weight of the total composition. A large number of elements such as e.g. F, Cl or the alkalis Rb, Cs are customary impurities in the case of the batch raw materials used on an industrial scale. Other compounds such as e.g. those of the elements Ge, rare earths, Bi, W, Nb, Ta, Y can be added in small proportions.

Some polyvalent components such as the refining agents $SnO_2$ and $Fe_2O_3$ and also $V_2O_5$ are presented as usual in their higher oxidation state. A certain proportion of these components will be found in the lower valency state in the molten glass, as is known, on account of the oxygen release that increases with the melting temperature.

Besides the colored oxide $V_2O_5$ in contents of 0.01 to 0.06% by weight, further coloring components such as e.g. chromium, manganese, cobalt, nickel, copper, selenium, rare earth, molybdenum compounds can also be used to support the coloration. Their content is limited to amounts of at most 1% by weight, because these compounds generally reduce the transmission in the infrared.

The water content of the crystallizable glasses for producing the glass ceramics according to the invention is usually between 0.015 and 0.06 mol/l depending on the choice of batch raw materials and the process conditions in the melt. This corresponds to β-OH values of 0.16 to 0.64 $mm^{-1}$ for the crystallizable glasses.

In order to improve the bubble quality, besides the main refining agents tin oxide and iron oxide used, further refining additives such as e.g. $CeO_2$, sulphate, sulphide and halide compounds can additionally be used. Their contents are usually limited to amounts up to 1% by weight.

The oxides $Li_2O$, $Al_2O_3$ and $SiO_2$ within the preferred limits indicated are necessary constituents of the beta-quartz solid solutions.

The addition of the alkalis $Na_2O$ and $K_2O$ in contents of 0.2 to 1.5% by weight improves the meltability and the devitrification stability during the shaping of the glass.

Furthermore, additions of $TiO_2$ and $ZrO_2$ in the amounts indicated are required as nucleating agents for the crystallization during the production of the glass ceramic. The amount of the components having a nucleating effect $TiO_2$, $ZrO_2$ and $SnO_2$ is intended to be together 3.8 to 6% by weight in order to ensure the nucleation during the crystallization of the glass ceramic without devitrification problems already occurring.

For coloring the glass ceramic in the visible range, the colored oxide $V_2O_5$ is used in ranges of 0.01 to 0.06% by weight. Together with the $Fe_2O_3$, this combination of the two colorants makes it possible to set a transmission profile such as is desired for glass ceramics which are used as cook tops. Besides the presented infrared transmission of approximately 40-80% at 1600 nm and given a thickness of 4 mm, these are primarily a light transmission (brightness Y) of 0.8 to 2.5% and a transmission at the wavelength of the emission of red light-emitting diodes of 630 nm, which amounts to 3 to 9%. The composition indicated is preferably directed to the production of glass ceramics that are given dark coloration. As further optional components, MgO, ZnO and $P_2O_5$ can be incorporated into the beta-quartz solid solutions. The alkaline earths CaO, SrO, BaO and $B_2O_3$ improve the meltability and the devitrification stability during the shaping of the glass.

The requirements imposed by the production process and the requirements of the application are both satisfied with the stated composition range. Melt, refining and ceramization of the LAS glasses are ensured technically, economically and in an environmentally friendly manner. The requirements imposed by the use of the glass ceramic produced from the crystallisable glass as cook top, in particular, such as e.g. thermal loading capacity, chemical resistance and transmission, are advantageously met.

For economic production, the crystallizable LAS glass is intended to be readily meltable and refinable and to have a high devitrification resistance. The viscosity curve of the glass melt is of importance for assessing these properties. The viscosity with a value of $10^4$ dPas is intended to be attained at a temperature of at most 1320° C. and preferably at most 1310° C. The viscosity value of $10^2$ dPas is intended to be attained at a temperature of at most 1750° C. In order to lower the viscosity of the glass melt, it has proved to be necessary to reduce the content of $SiO_2$, $Al_2O_3$, $ZrO_2$, while the contents of alkalis $Na_2O$ and $K_2O$, alkaline earths CaO, SrO and BaO are chosen with higher values. The reduction of the $ZrO_2$ content to at most 1.6% by weight is also advantageous in order to reduce the formation of the surface layer having batch remnants of the slowly soluble Zr raw material. For improving the devitrification resistance it is advantageous to lower the contents of $Li_2O$, $Al_2O_3$, $SiO_2$, $ZrO_2$ and $SnO_2$, since these components can form critical crystal phases for the devitrification. In order to realize the advantages mentioned, according to one preferred method, provision is made of a glass batch for an LAS glass system which leads to a colored glass ceramic with beta-quartz solid solutions as predominant crystal phase, having a composition in % by weight on the basis of oxide which substantially consists of:

| | |
|---|---|
| $Li_2O$ | 3.2-4.0 |
| $Na_2O$ | 0.2-1 |
| $K_2O$ | 0.1-1 |
| $\Sigma Na_2O + K_2O$ | 0.4-1.2 |
| MgO | 0.1-1.2 |
| CaO | 0.2-1 |
| SrO | 0-1 |
| BaO | 0-3 |
| $\Sigma CaO + SrO + BaO$ | 0.2-4 |
| ZnO | 0-1.8 |
| $B_2O_3$ | 0-1 |
| $Al_2O_3$ | 19-22 |
| $SiO_2$ | 62-67 |
| $TiO_2$ | 2.8-4 |
| $ZrO_2$ | 0.5-1.6 |
| $P_2O_5$ | 0-1.5 |
| $SnO_2$ | 0.1-0.5 |
| $\Sigma TiO_2 + ZrO_2 + SnO_2$ | 4.2-6 |
| $V_2O_5$ | 0.01-0.05 |
| $Fe_2O_3$ | 0.08-0.15. |

The iron content $Fe_2O_3$ is set to 0.08 to 0.15% by weight in order to optimize the transmission profile of the glass ceramic in the infrared and in the visible range.

According to one preferred method, provision is made of a glass batch for an LAS glass system in which the content of the refining agent tin oxide is set to values of <0.35, preferably <0.3% by weight. The reduction of the $SnO_2$ is advantageous in order to improve the devitrification resistance during shaping. Furthermore, the tendency toward corrosion on noble metal built-in structures in the melting tank is reduced. The tin oxide reacts in particular with Pt-containing built-in structures such as e.g. stirrers, electrodes or the pulling nozzle and can shorten the service life thereof.

Preferably, the glass batch for the LAS glass has a $V_2O_5$ content of less than 0.04%, and preferably less than 0.03%, by weight. Since vanadium oxide is a costly raw material, it is economically advantageous to minimize the content of $V_2O_5$. Furthermore, vanadium oxide is classified as a hazardous substance and therefore not safe with regard to environmental points of view. The compositions according to the invention make it possible, with these low $V_2O_5$ contents, even in the range of visible light starting from 450 nm, to set a transmission of >0.2%, which is advantageous for the indication capability of a cook top with blue, green, yellow, orange or white light-emitting diodes. The conventional indication capability with proven red light-emitting diodes is ensured without any change.

Preferably, an LAS crystallizable glass melted and refined according to the method according to the invention, after conversion into the glass ceramic with beta-quartz solid solutions as predominant crystal phase, is used as a cook top. Suitable shaping methods for the plate-shaped geometry required are rolling and floating.

Glass ceramic plates with thicknesses of 2.5 to 6 mm are usually used for cook tops.

On account of the favorable transmission profile associated with the composition according to the invention, the cook top has an improved color indication capability for blue, green, yellow, orange and white light-emitting diodes. All forms of indicators, punctiform as well as areal, are possible. On account of the uniform spectral profile of the transmission in the visible range, it is also possible for the first time to present color displays or screens.

By means of the roller shaping, the cook top underside can be provided with customary knobs or be made smooth. It is possible to roll in regions having a smaller thickness for display indicators.

Radiant heating elements, halogen heating elements, induction heating or gas can be used as heating for the cook top. In this case, the cook top can be shaped not only as a planar plate, but also three-dimensionally. Canted, angled or curved plates can be used. The cook tops are technically free of arsenic oxide and/or antimony oxide. The combination refining using tin oxide and iron oxide at temperatures of at least 1600° C. and the use of a raw material mix established according to the invention for the glass batch lead to good bubble qualities of <3 and preferably <1 bubble/kg in the cook top.

The present invention is illustrated further with the aid of the following examples.

EXAMPLES

Table I shows the composition of the crystallizable glass according to the invention for a lithium aluminium silicate glass ceramic in % by weight on an oxide basis and the various compounds used as batch raw materials for the components. When calculating the raw material mix it should be taken into consideration that some raw materials also contain certain amounts of impurities, depending on quality. Thus, by way of example, the spodumene, depending on the commercial quality, contains different $Li_2O$ contents and also certain amounts of potassium, sodium and calcium feldspar, and also $Fe_2O_3$. This must be taken into account when calculating the batch formulation in order to obtain the desired composition of the LAS glass.

Glass No. 2 is a comparative glass, which is refined using arsenic oxide instead of tin oxide and otherwise has the same composition. The $As_2O_3$ used as batch raw material is converted during the melting-down with oxygen from the tank atmosphere or the nitrate decomposition to form $As_2O_5$.

TABLE I

Composition (in % by weight) of the LAS glass No. 1 according to the Invention and of the Comparative Glass No. 2 and Raw Material Compounds used

| | Glass No. 1 | Glass No. 2 | Raw material compounds |
|---|---|---|---|
| $Li_2O$ | 3.84 | 3.81 | Depending on example: spodumene, petalite, lithium carbonate |
| $Na_2O$ | 0.59 | 0.59 | sodium feldspar, sodium nitrate |
| $K_2O$ | 0.28 | 0.28 | potassium feldspar, potassium nitrate |
| MgO | 0.31 | 0.31 | magnesite, dolomite |
| CaO | 0.42 | 0.42 | dolomite, calcium feldspar |
| BaO | 2.29 | 2.27 | barium carbonate |
| ZnO | 1.50 | 1.49 | zinc oxide |
| $Al_2O_3$ | 20.60 | 20.44 | aluminium trihydroxide, and also, depending on example: spodumene, petalite |
| $SiO_2$ | 65.33 | 64.84 | quartz sand, and also, depending on example: spodumene, petalite |
| $TiO_2$ | 3.12 | 3.10 | titanium dioxide |
| $ZrO_2$ | 1.36 | 1.35 | zirconium silicate |
| $SnO_2$ | 0.24 | — | tin oxide |
| $V_2O_5$ | 0.024 | 0.024 | vanadium oxide |
| $Fe_2O_3$ | 0.095 | 0.094 | iron oxide |
| $As_2O_3$ | — | 0.99 | arsenic oxide |
| Sum | 100.00 | 100.00 | |
| Properties | | | |
| Tg [° C.] | 670 | | |
| $V_A$ [° C.] | 1305 | | |
| $T(\eta = 10^2$ dPas) [° C.] | 1734 | | |

TABLE I-continued

Composition (in % by weight) of the LAS glass No. 1 according to the Invention and of the Comparative Glass No. 2 and Raw Material Compounds used

|  | Glass No. 1 | Glass No. 2 | Raw material compounds |
|---|---|---|---|
| Density g/cm$^3$ | 2.479 | | |
| Thermal expansion α 20/300 · [10$^{-6}$/K] | 4.3 | | |
| UDEV [° C.] | 1235 | | |
| IR transmission 1600 nm [%] | 76.3 | | |

Table I also presents some properties measured on the glass such as density, transformation temperature Tg, processing temperature $V_A$, the temperature for the viscosity $10^2$ dPas, the thermal expansion between 20 and 300° C. and the upper devitrification temperature UDEV. The infrared transmission at 1600 nm was determined for a thickness of 4 mm.

During the laboratory experiments for varying the raw material mixes for the glass batch of the LAS glass, approximately 2 kg of well-premixed glass batch were introduced into platinum crucibles. The crucibles had a height of approximately 250 mm and a diameter of approximately 70 mm. The crucibles were placed into a furnace with a homogeneous temperature and the glass batch was melted. The experiments for assessing the melting-down behaviour were carried out at 1600° C., for 1 h (Table II).

TABLE II

MELTING-DOWN EXPERIMENTS FOR RAW MATERIAL BATCHES (1600° C., 1 HOUR), MAIN BATCH RAW MATERIALS (RELATIVE TO 1 KG OF BATCH), LIBERATED GASES (IN MILLIMOL) AND ASSESSMENT OF THE GLASS QUALITY

| | Example No. | | | | | |
|---|---|---|---|---|---|---|
| | 1 | 2 | 3 | 4 | 5 | 6 |
| Main batch raw materials | | | | | | |
| Petalite | 577 g | | | | | |
| Spodumene Q1 | | 473 g | | | | |
| Spodumene Q2 | | | 760 g | 532 g | | |
| Lithium carbonate | | | | | 80 g | 80 g |
| Aluminium trihydroxide | 14 g | 102 g | 86 g | 60 g | 264 g | 262 g |
| Quartz sand | 145 g | 302 g | 38 g | 27 g | 544 g | 540 g |
| Cullets | 0 g | 0 g | 0 g | 300 g | 0 g | 0 g |
| Proportion of Li$_2$O—Al$_2$O$_3$—SiO$_2$ compound | 57.7% | 47.3% | 76% | 76% | 0% | 0% |
| Proportion of quartz sand | 14.5% | 30.2% | 3.8% | 3.8% | 54.4% | 54.0% |
| Gas liberation (1 kg batch) [mmol]: | | | | | | |
| Lithium carbonate | — | — | — | — | 1080 CO$_2$ | 1080 CO$_2$ |
| Sodium nitrate | 114 NO$_x$ | 146 NO$_x$ | 97 NO$_x$ | 68 NO$_x$ | 142 NO$_x$ | 142 NO$_x$ |
| Potassium nitrate | 41 NO$_x$ | 50 NO$_x$ | — | — | 49 NO$_x$ | 49 NO$_x$ |
| Barium carbonate | 137 CO$_2$ | 140 CO$_2$ | 142 CO$_2$ | 100 CO$_2$ | 125 CO$_2$ | 125 CO$_2$ |
| Dolomite | 118 CO$_2$ | 129 CO$_2$ | 127 CO$_2$ | 89 CO$_2$ | 122 CO$_2$ | 122 CO$_2$ |
| Tin oxide | 7 O$_2$ | 8 O$_2$ | 7 O$_2$ | 5 O$_2$ | 7 O$_2$ | — |
| Iron oxide | 3 O$_2$ | 3 O$_2$ | 3 O$_2$ | 2 O$_2$ | 3 O$_2$ | 3 O$_2$ |
| Arsenic oxide | — | — | — | — | — | 42 O$_2$ |
| Ratio in mol: O$_2$/CO$_2$ + NO$_x$ | 0.024 | 0.024 | 0.027 | 0.027 | 0.007 | 0.030 |
| Glass quality: | | | | | | |
| Visual assessment of melt surface | 4 | 3-4 | 2 | 1 | 5 | 0 |
| Area proportion of batch remnants edge/centre of the drill core [Fl. %] | 50/20 | 30/35 | 20/5 | 10/2 | 60/50 | 5/5 |
| Cristobalite proportion for 2 mm thick surface layer [Vol. %] | 3.6 | 8.0 | 4.7 | 0.5 | 22 | <0.1 |

After the specified time, the platinum crucible with the molten batch was removed and, in a cooling furnace, starting at 680° C., the glass situated in the crucible was cooled down in a stress-free manner at a cooling rate of 20 K/min to room temperature. The cooled glass with the melt surface was drilled from the crucible using a diamond hollow drill and the drill cores obtained were assessed with regard to quality. The diameter of the drill cores was 55 mm. Since the experiments were carried out uniformly, they permit a relative comparison of the melting-down behavior of the various raw materials, in particular as far as the formation of the surface layer with batch remnants is concerned. The melting-down behavior of the various raw material mixes was examined under experimental conditions of 1600° C., 1 hour.

Examples 1 to 4 in Table II are examples according to the invention with varied $Li_2O$, $Al_2O_3$ and $SiO_2$ compounds as dominant batch raw materials. Examples 2 and 3 were melted with commercially available spodumene raw materials having different qualities, that is to say different $Li_2O$ contents. Example 4 furthermore contains 30% by weight of cullets of the same composition as the resulting glass. Example 5 is a comparative example with lithium carbonate and combination refining of tin oxide and iron oxide, which leads to a glass having the same composition. Examples 1 to 5 lead to a glass having the same composition corresponding to glass No. 1 from Table I. Comparative example 6 corresponds to glass No. 2 from Table I and is refined using arsenic oxide instead of the combination refining. Table II shows the proportions of $Li_2O$, $Al_2O_3$ and $SiO_2$ compounds and of the quartz sand relative to 1 kg of raw material mix for the glass batch. Added cullets are not taken into account in the calculation, but yield an additional improvement in the melting-down behavior and the bubble quality. These main portions of the batch consist of commercially available raw material qualities. Furthermore, the insoluble foreign gases released from the raw materials used in accordance with Table I and the maximum $O_2$ refining gas liberated and their ratio are determined. The gas released during nitrate decomposition is calculated as $NO_x$ foreign gas, possible cleavage of $O_2$ is not taken into account since this reaction takes place at temperatures that are too low for a refining effect.

The formation of the surface layers with batch remnants was firstly assessed visually. In relation to the comparatively dark glass, the white batch remnants at the surface are clearly discernible. In the visual assessment, a very high degree of formation was assessed as 5, average formation as 3 and a 0 was assigned in the case of no visible batch remnants. In addition, the surface was photographed and the area proportion of the white undissolved batch remnants was quantified by means of computer-aided image processing. Surface bubbles were filtered out for the calculation. Since the batch remnants accumulate depending on the raw material usually at the edge of the platinum crucible and therefore also at the edge of the drill core, the values for edge and center of the drill core were determined.

The drill cores obtained were halved in the longitudinal direction for assessment. A transverse microsection was produced and an approximately 4 mm thick pane was polished. The formation of batch remnants is a factor that influences the visual assessment.

BRIEF DESCRIPTION OF THE DRAWING

The objects, features and advantages of the invention will now be illustrated in more detail, with reference to the accompanying figures in which:

FIGS. 1a and 1b are photographs of the drill core surfaces from the glass corresponding to example 3 with spodumene and combination refining using iron oxide and tin oxide according to the invention. FIGS. 2a and 2b are photographs of the drill core surfaces from the glass corresponding to comparative example 5 with lithium carbonate and combination refining. FIGS. 3a and 3b are photographs of the drill core surfaces from the glass corresponding to comparative example 6 with lithium carbonate and arsenic refining corresponding to comparative glass 2 from Table I. A line indicating the scale of 1500 μm has been inserted below each photograph.

Figure 1A:
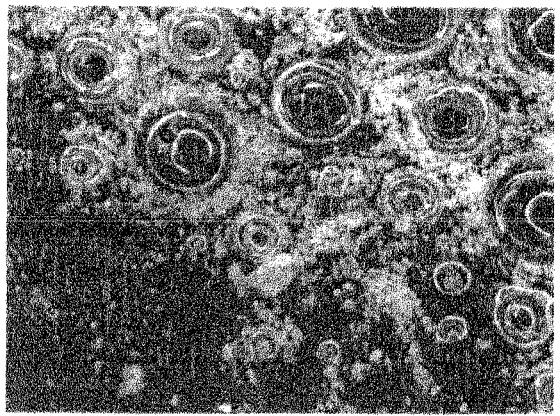
FIGS. 1a and 1b are black-and-white copies of photographs showing respective plan views of a melt surface from the edge and center of a previously described drill core taken from the glass of example 3.
Figure 1B:
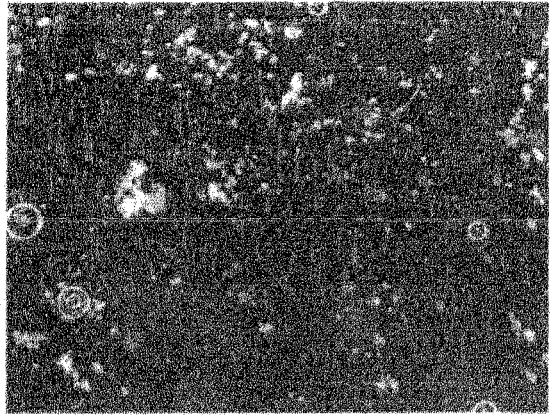
Figure 2A:
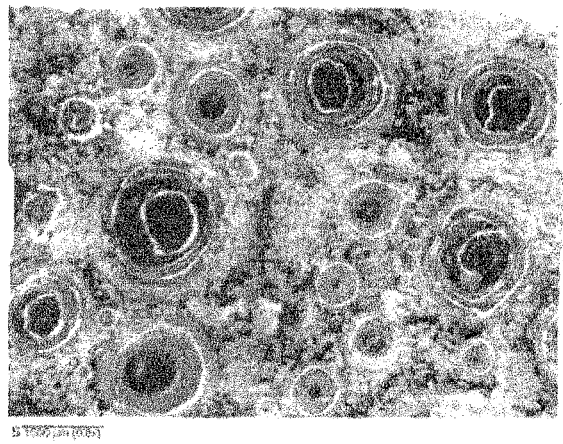
FIGS. 2a and 2b are black-and-white copies of photographs showing respective plan views of a melt surface from the edge and center of a previously described drill core taken from the glass of comparative example 5.
Figure 2B:
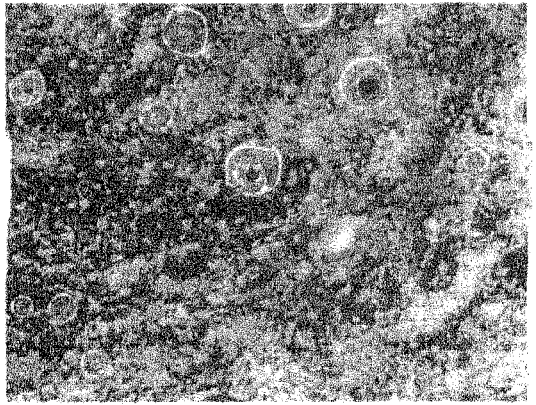
Figure 3A:
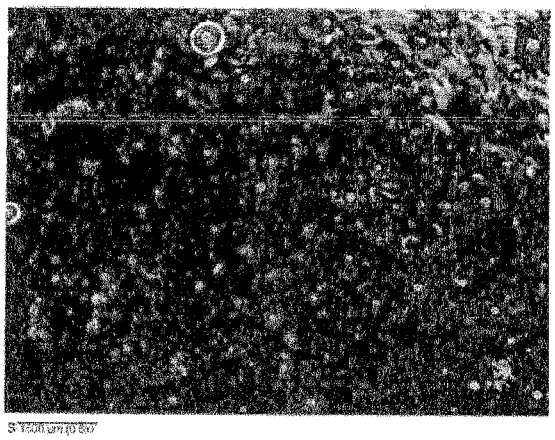
FIGS. 3a and 3b are black-and-white copies of photographs showing respective plan views of a melt surface from the edge and center of a previously described drill core taken from the glass of comparative example 6.
Figure 3B:
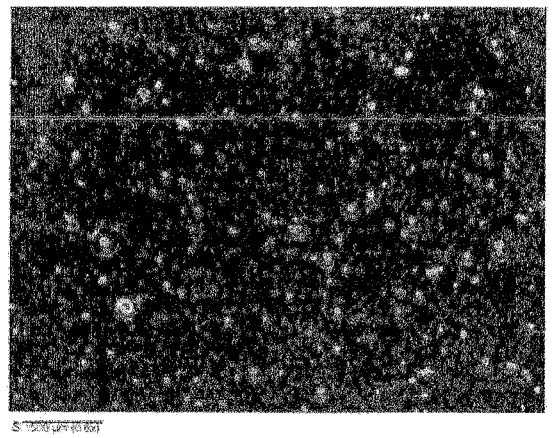

A circle sector of approximately 30° was cut from the drill core and the surface of the glass melt was cut off with a thickness of 2 mm. This corresponds to the depth to which batch remnants were still found. The material obtained was pulverized and analysed by X-ray diffraction with regard to the crystal phases and their proportions in vol. %. The cristobalite formed from the quartz sand is found as the sole crystal phase.

Upon examination by light microscopy an adhering gas bubble is often found on the batch particles.

The results reveal the great dependence of the glass quality on the proportion of quartz sand in the raw material mix for the glass batch. The good quality, i.e. homogeneity and small or no surface layer in Comparative Example 6 with arsenic refining is attributed to the homogenizing effect of the liberated $O_2$ refining bubbles. Since arsenic oxide liberates the refining oxygen even at comparatively low temperatures and, moreover, in relatively large amounts, a kind of microstirrer effect and therefore good homogenization and good melting-down without a surface layer are achieved here. The superior quality of the examples according to the invention relative to comparative example 5 with lithium carbonate shows that the employed batch raw material for the $Li_2O$—$Al_2O_3$—$SiO_2$ compound has a great influence in the case of combination refining using tin oxide and iron oxide.

In an additional example No. 7 a composition in accordance with glass 1 from Table I and with a raw material mix for the glass batch corresponding to Example 4 from Table II was melted on an industrial scale. The melting tank is equipped with a bridge wall. The heating is affected by means of gas burners and by means of electrical additional heating using electrodes that are immersed in the glass melt. By means of this heating, a glass temperature of 1660° C. is set during refining in the region of the hot spot. High-temperature refining at temperatures of >1700° C. was dispensed with. The bubble quality of the LAS glass obtained was less than 0.5 bubble/kg of glass. During shaping, a pimpled glass ribbon having a thickness of 4 mm was produced and cooled down in a cooling furnace in order to avoid stresses. Cook tops having a size of 500×500×4 mm were cut from this glass ribbon and ceramicized in an industrial roller furnace. During ceramicizing, the plates were nucleated for 25 min in a temperature range of 700 to 800° C. and crystallized at a maximum temperature of 910° C., for 10 min. The glass ceramics obtained have the desired transmission values given a thickness of 4 mm of greater than 0.2% in the range of visible light starting from 450 nm. A transmission value of 0.4% is measured at 470 nm. The thermal expansion coefficient between 20 and 700° C. is $0.2 \cdot 10^{-6}$/K. The requirements imposed by the application as a cook top, such as e.g. thermal loading capacity, chemical resistance and transmission are advantageously met.

While the invention has been illustrated and described as embodied in a method of environmentally friendly melting and refining of a glass melt for a crystallizable glass of a lithium aluminium silicate (las) glass ceramic, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method of environmentally friendly melting a glass batch to form a glass melt of a crystallizable glass and of refining said glass melt of said crystallizable glass, said crystallizable glass being useful for making a lithium aluminium silicate (LAS) glass ceramic, said method consisting of the steps of:
   a) providing a glass batch consisting of a raw material mixture, so that said glass batch has a main batch composition within a lithium aluminium silicate (LAS) glass system, in which a refining agent has been added, said refining agent consisting of 0.1-<0.6% by weight of tin oxide and 0.05-0.3% by weight of $Fe_2O_3$, said glass batch does not contain any arsenic oxide and does not contain any antimony oxide for refining, said raw material mixture comprises quartz sand and at least one member selected from the group consisting of petalite and spodumene, and said quartz sand is present in said raw material mixture in an amount of less than 40 wt. %;
   b) melting said glass batch in a melting tank to form a glass melt;
   c) refining said glass melt with oxygen produced from said main refining agent at temperatures of at least 1600° C. in said melting tank; and
   d) choosing a throughput of said glass melt through said melting tank or an average residence time of the glass melt in the melting tank so that a bubble count of bubbles with a size of at least 100 μm below 1 bubble per kg;
   wherein said glass batch substantially consists, in % by weight based on oxide content, of:

| | |
|---|---|
| $Li_2O$ | 3.0-4.2 |
| $\Sigma Na_2O + K_2O$ | 0.2-1.5 |
| MgO | 0-1.5 |
| $\Sigma CaO + SrO + BaO$ | 0-4 |
| ZnO | 0-2 |
| $B_2O_3$ | 0-2 |
| $Al_2O_3$ | 19-23 |
| $SiO_2$ | 60-69 |
| $TiO_2$ | 2.5-4 |
| $ZrO_2$ | 0.5-2 |
| $P_2O_5$ | 0-3 |
| $SnO_2$ | 0.1-<0.6 |
| $\Sigma TiO_2 + ZrO_2 + SnO_2$ | 3.8-6 |
| $V_2O_5$ | 0.01-0.06 |
| $Fe_2O_3$ | 0.05-0.3; | so that a colored glass ceramic with a beta-quartz solid solution as predominant crystal phase can be formed from the crystallizable glass after said refining.

2. The method according to claim 1, wherein said raw material mixture comprises at least 45% by weight of a $Li_2O$—$Al_2O_3$—$SiO_2$ compound.

3. The method according to claim 1, wherein said raw material mixture comprises at least 70% by weight of a $Li_2O$—$Al_2O_3$—$SiO_2$ compound.

4. The method according to claim 1, further comprising formulating said glass batch with said composition within said lithium aluminium silicate (LAS) glass system so that a ratio of a maximum amount of $O_2$ refining gas, in mol, liberated during refining to an amount of insoluble foreign gases, in mol, released during batch decomposition is greater than 0.02 or so that the following condition is satisfied: maximum amount of $O_2$ liberated [mol]/insoluble foreign gases [mol] >0.02.

5. The method according to claim 1, further comprising adding 20 to 60% by weight of cullets to said glass batch.

6. The method according to claim 1, further comprising adjusting an infrared absorption of the glass melt to a value corresponding to an infrared transmission of 40 to 80% at a glass melt thickness of 4 mm and at room temperature.

7. The method according to claim 1, wherein said temperatures at which said refining is carried out are less than 1700° C., and further comprising dispensing with additional specific high-temperature refining units.

8. The method according to claim 1, wherein said temperatures at which said refining is carried out are greater than 1750° C.

9. The method according to claim 1, wherein said glass batch consists, in % by weight based on oxide content, of:

| | |
|---|---|
| $Li_2O$ | 3.2-4.0 |
| $Na_2O$ | 0.2-1 |
| $K_2O$ | 0.1-1 |
| $\Sigma Na_2O + K_2O$ | 0.4-1.2 |
| MgO | 0.1-1.2 |
| CaO | 0.2-1 |
| SrO | 0-1 |
| BaO | 0-3 |
| $\Sigma CaO + SrO + BaO$ | 0.2-4 |
| ZnO | 0-1.8 |
| $B_2O_3$ | 0-1 |
| $Al_2O_3$ | 19-22 |
| $SiO_2$ | 62-67 |
| $TiO_2$ | 2.8-4 |
| $ZrO_2$ | 0.5-1.6 |
| $P_2O_5$ | 0-1.5 |
| $SnO_2$ | 0.1-0.5 |
| $\Sigma TiO_2 + ZrO_2 + SnO_2$ | 4.2-6 |
| $V_2O_5$ | 0.01-0.05 |
| $Fe_2O_3$ | 0.08-0.15. |

10. The method according to claim 1, wherein said glass batch contains less than 0.3% by weight of said tin oxide.

11. The method according to claim 1, wherein said glass batch contains less than 0.03% by weight of said $V_2O_5$.

12. A cook top comprising a glass ceramic made from a crystallizable glass obtainable by a method according to claim 1, so that said glass ceramic is colored and has a beta quartz solid solution as predominant crystal phase.

13. The method according to claim 1, wherein said raw material mixture contains less than 15 wt. % of said quartz sand.

14. The method according to claim 1, wherein said raw material mixture contains less than 5 wt. % of said quartz sand.

* * * * *